(12) United States Patent
Guo et al.

(10) Patent No.: US 10,924,017 B2
(45) Date of Patent: Feb. 16, 2021

(54) TECHNIQUES FOR CONTROLLING A SINGLE-INDUCTOR MULTIPLE-OUTPUT SWITCHED-MODE POWER SUPPLY

(71) Applicant: QUALCOMM Incorporated, San Diego, CA (US)

(72) Inventors: Linfei Guo, Daly City, CA (US); Chengwu Tao, Palo Alto, CA (US); Joseph Duncan, Carlsbad, CA (US); Amir Parayandeh, San Francisco, CA (US); Xiaocheng Jing, San Jose, CA (US); Justin Philpott, San Francisco, CA (US); Lin Xue, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/440,434

(22) Filed: Jun. 13, 2019

(65) Prior Publication Data

US 2020/0395848 A1 Dec. 17, 2020

(51) Int. Cl.
*H02M 3/158* (2006.01)
*H02M 1/00* (2006.01)

(52) U.S. Cl.
CPC .......... *H02M 3/158* (2013.01); *H02M 3/1582* (2013.01); *H02M 2001/009* (2013.01)

(58) Field of Classification Search
CPC ........... H02M 2001/009; H02M 3/158; H02M 3/1582
See application file for complete search history.

(56) References Cited

U.S. PATENT DOCUMENTS

| 9,692,296 | B1* | 6/2017 | Dash | H02M 3/04 |
| 2004/0017111 | A1* | 1/2004 | May | H02J 1/10 |
| | | | | 307/31 |
| 2006/0007617 | A1* | 1/2006 | Kranz | H02M 3/158 |
| | | | | 361/90 |
| 2012/0169307 | A1* | 7/2012 | Chen | H02M 3/158 |
| | | | | 323/271 |
| 2015/0008742 | A1* | 1/2015 | Huang | H02M 3/158 |
| | | | | 307/31 |
| 2015/0188407 | A1* | 7/2015 | Golder | H02J 1/00 |
| | | | | 307/31 |
| 2017/0012529 | A1* | 1/2017 | Yamada | H02M 3/158 |

(Continued)

*Primary Examiner* — Fred E Finch, III
(74) *Attorney, Agent, or Firm* — Patterson & Sheridan, LLP

(57) ABSTRACT

Certain aspects of the present disclosure generally relate to methods and apparatus for operating a switched-mode power supply (SMPS). One example method generally includes selecting a first output of a plurality of outputs of the SMPS based on a power demand associated with each of the plurality of outputs if a voltage at the first output is less than a reference voltage associated with the first output, by selecting as the first output one of the plurality of outputs having the highest power demand, and based on an amount of overcharge associated with the first output if the voltage at the first output is greater than the reference voltage, by selecting as the first output one of the plurality of outputs having the lowest amount of overcharge. The method may also include directing current across an inductive element of the SMPS to the first output based on the selection.

20 Claims, 7 Drawing Sheets

(56) References Cited

U.S. PATENT DOCUMENTS

| | | | |
|---|---|---|---|
| 2017/0149240 A1* | 5/2017 | Wu | H02J 1/00 |
| 2018/0062515 A1* | 3/2018 | Jung | H02M 3/158 |
| 2019/0068051 A1* | 2/2019 | Yang | H02M 3/158 |
| 2019/0372464 A1* | 12/2019 | Petricaroli | H02M 3/1582 |
| 2020/0076299 A1* | 3/2020 | Xue | H02M 3/158 |

* cited by examiner

TECHNIQUES FOR CONTROLLING A SINGLE-INDUCTOR MULTIPLE-OUTPUT SWITCHED-MODE POWER SUPPLY

TECHNICAL FIELD

Certain aspects of the present disclosure generally relate to electronic circuits and, more particularly, to circuits for power regulation.

BACKGROUND

A voltage regulator ideally provides a constant direct current (DC) output voltage regardless of changes in load current or input voltage. Voltage regulators may be classified as either linear regulators or switching regulators. While linear regulators tend to be small and compact, many applications may benefit from the increased efficiency of a switching regulator. A switching regulator may be implemented by a switched-mode power supply (SMPS), such as a buck converter or a boost converter.

Power management integrated circuits (power management ICs or PMICs) are used for managing the power requirement of a host system. A PMIC may be used in battery-operated devices, such as mobile phones, tablets, laptops, wearables, etc., to control the flow and direction of electrical power in the devices. The PMIC may perform a variety of functions for the device such as direct-current (DC)-to-DC conversion, battery charging, power-source selection, voltage scaling, power sequencing, etc.

SUMMARY

Certain aspects of the present disclosure generally relate to a method for operating a switched-mode power supply (SMPS). The method generally includes selecting a first output of a plurality of outputs of the SMPS based on a power demand associated with each of the plurality of outputs if a voltage at the first output is less than a reference voltage associated with the first output, by selecting as the first output one of the plurality of outputs having the highest power demand, and based on an amount of overcharge associated with the first output if the voltage at the first output is greater than the reference voltage, by selecting as the first output one of the plurality of outputs having the lowest amount of overcharge. The method may also include directing current across an inductive element of the SMPS to the first output based on the selection.

Certain aspects of the present disclosure provide a power supply system. The power supply system generally includes an SMPS, and a controller configured to select a first output of a plurality of outputs of the SMPS based on a power demand associated with each of the plurality of outputs if a voltage at the first output is less than a reference voltage associated with the first output, by selecting as the first output one of the plurality of outputs having the highest power demand, and based on an amount of overcharge associated with the first output if the voltage at the first output is greater than the reference voltage, by selecting as the first output one of the plurality of outputs having the lowest amount of overcharge, and configure the SMPS to direct current across an inductive element of the SMPS to the first output based on the selection.

Certain aspects of the present disclosure provide an apparatus for controlling an SMPS. The apparatus generally includes means for selecting a first output of a plurality of outputs of the SMPS based on a power demand associated with each of the plurality of outputs if a voltage at the first output is less than a reference voltage associated with the first output, by selecting as the first output one of the plurality of outputs having the highest power demand, and based on an amount of overcharge associated with the first output if the voltage at the first output is greater than the reference voltage, by selecting as the first output one of the plurality of outputs having the lowest amount of overcharge, and means for directing current across an inductive element of the SMPS to the first output based on the selection.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

An Example Device

Figure 1:
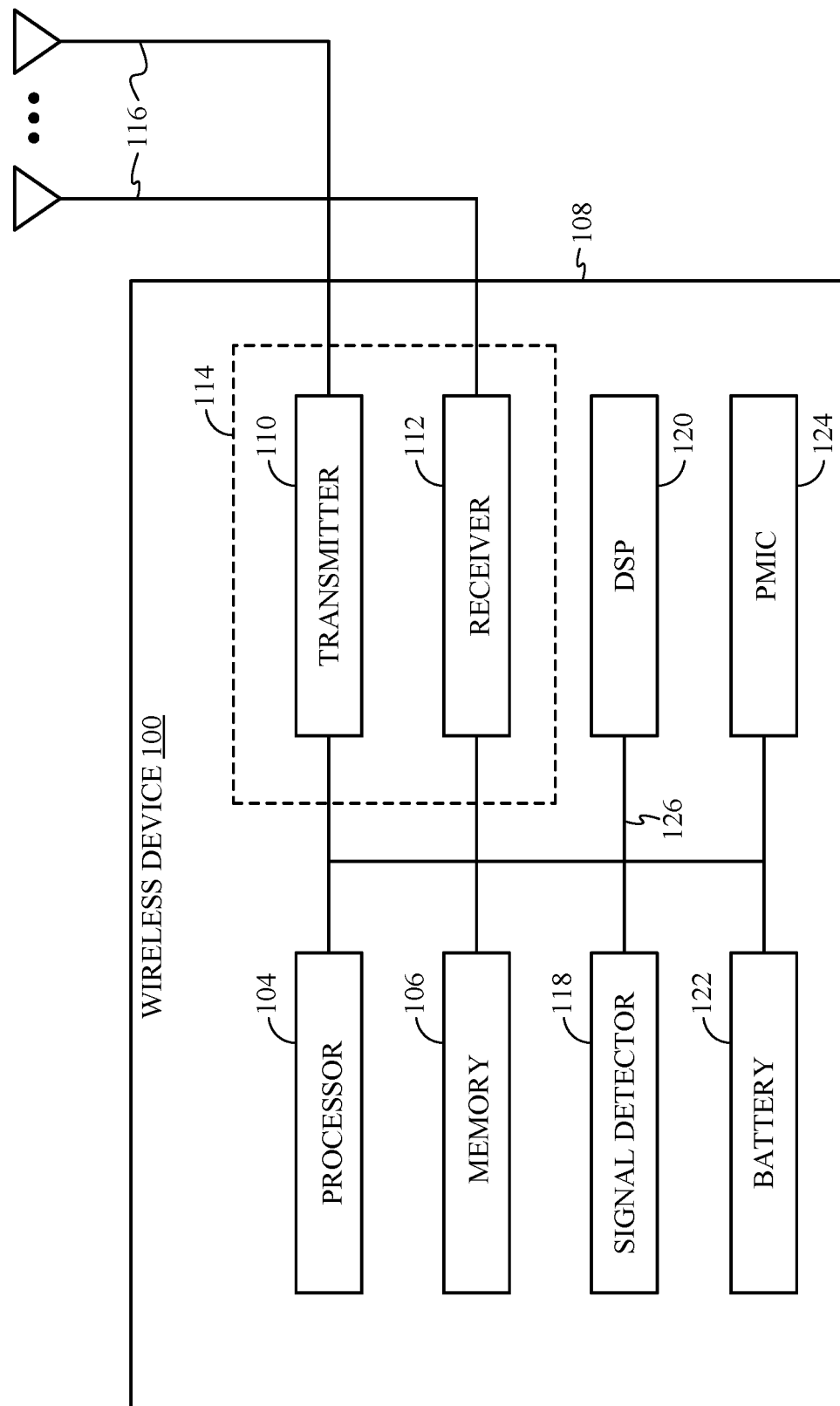
FIG. 1 illustrates a block diagram of an example device including a power regulator, according to certain aspects of the present disclosure.

FIG. 1 illustrates a device 100. The device 100 may be a battery-operated device such as a cellular phone, a personal digital assistant (PDA), a handheld device, a wireless modem, a laptop computer, a tablet, a personal computer, etc. The device 100 is an example of a device that may be configured to implement the various systems and methods described herein.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106. The instructions in the memory 106 may be executable to implement the methods described herein.

The device 100 may also include a housing 108 that may include a transmitter 110 and a receiver 112 to allow transmission and reception of data between the device 100 and a remote location. The transmitter 110 and receiver 112 may be combined into a transceiver 114. A plurality of transmit antennas 116 may be attached to the housing 108 and electrically coupled to the transceiver 114. The device 100 may also include (not shown) multiple transmitters, multiple receivers, and multiple transceivers.

The device 100 may also include a signal detector 118 that may be used in an effort to detect and quantify the level of signals received by the transceiver 114. The signal detector 118 may detect such signals as total energy, energy per subcarrier per symbol, power spectral density and other signals. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as DC-to-DC conversion, battery charging, power-source selection, voltage scaling, power sequencing, etc. In certain aspects, the PMIC 124 includes a voltage regulator which may be implemented using a single-inductor multiple-output (SIMO) switched-mode power supply (SMPS), as described in more detail herein.

The various components of the device 100 may be coupled together by a bus system 126, which may include a power bus, a control signal bus, and a status signal bus in addition to a data bus.

Example Switched-Mode Power Supply Control Scheme

A single-inductor multiple-output (SIMO) converter generally refers to a switched-mode power supply (SMPS) that may be used to provide multiple regulated voltages for multiple outputs using a single inductor. For example, a single-input dual-output (SIDO) converter may include two outputs. The first output of the SIDO converter may have a first voltage Vreg1, and the second output of the SIDO converter may have a second voltage Vreg2 which may be different than Vreg1. Either of the output voltages Vreg1 and Vreg2 may be higher, lower, or equal to a supply voltage (e.g., batter voltage (Vbat)) of the SMPS. In other words, the two outputs of the SIDO converter may be two boost outputs if both outputs are greater than the supply voltage, two buck outputs if both outputs are less than the supply voltage, or one output may be a buck output and the other output may be a boost output.

Figure 2A:
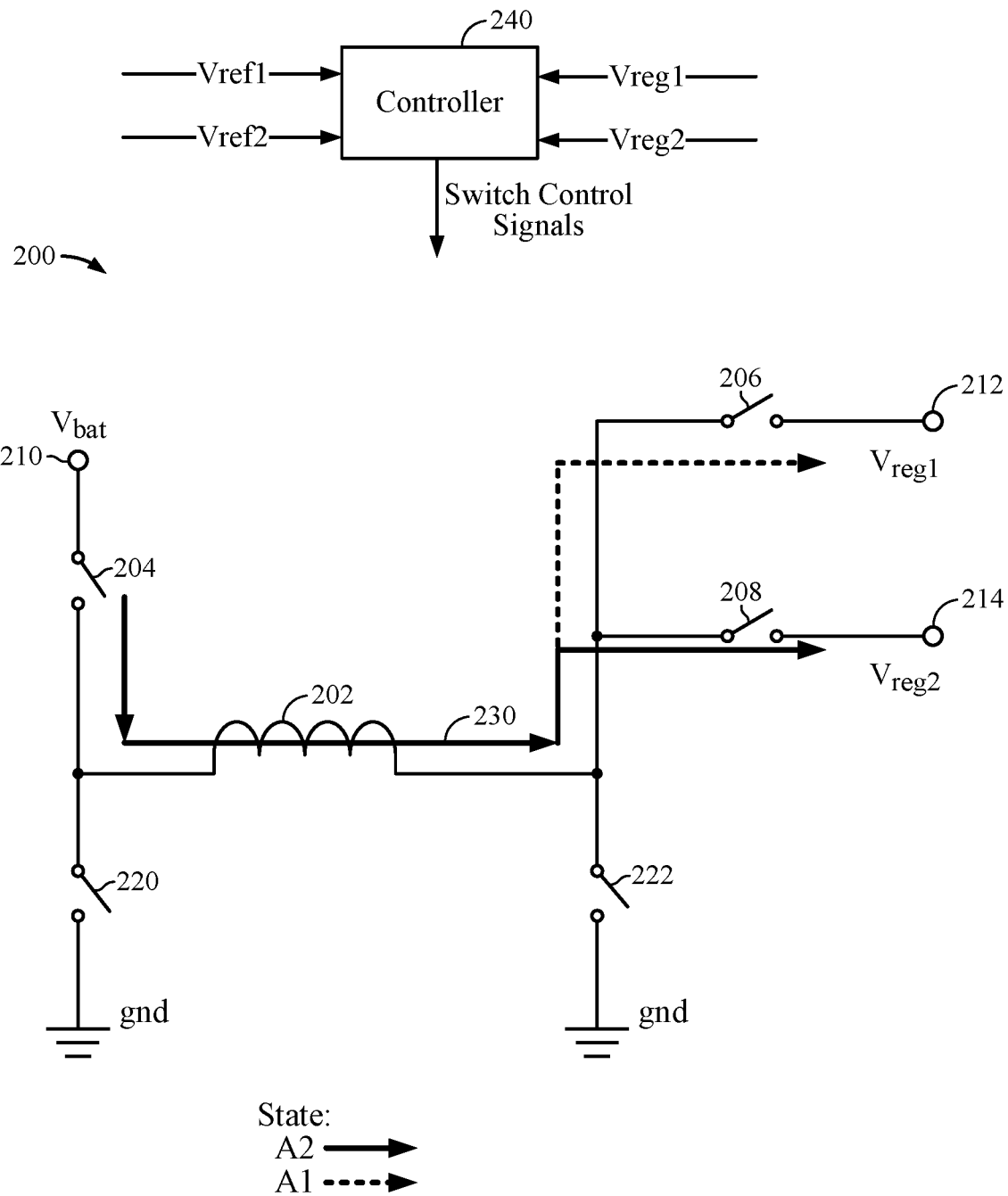
FIGS. 2A-2C are circuit diagrams of an example switched-mode power supply (SMPS) in three different states.
Figure 2B:
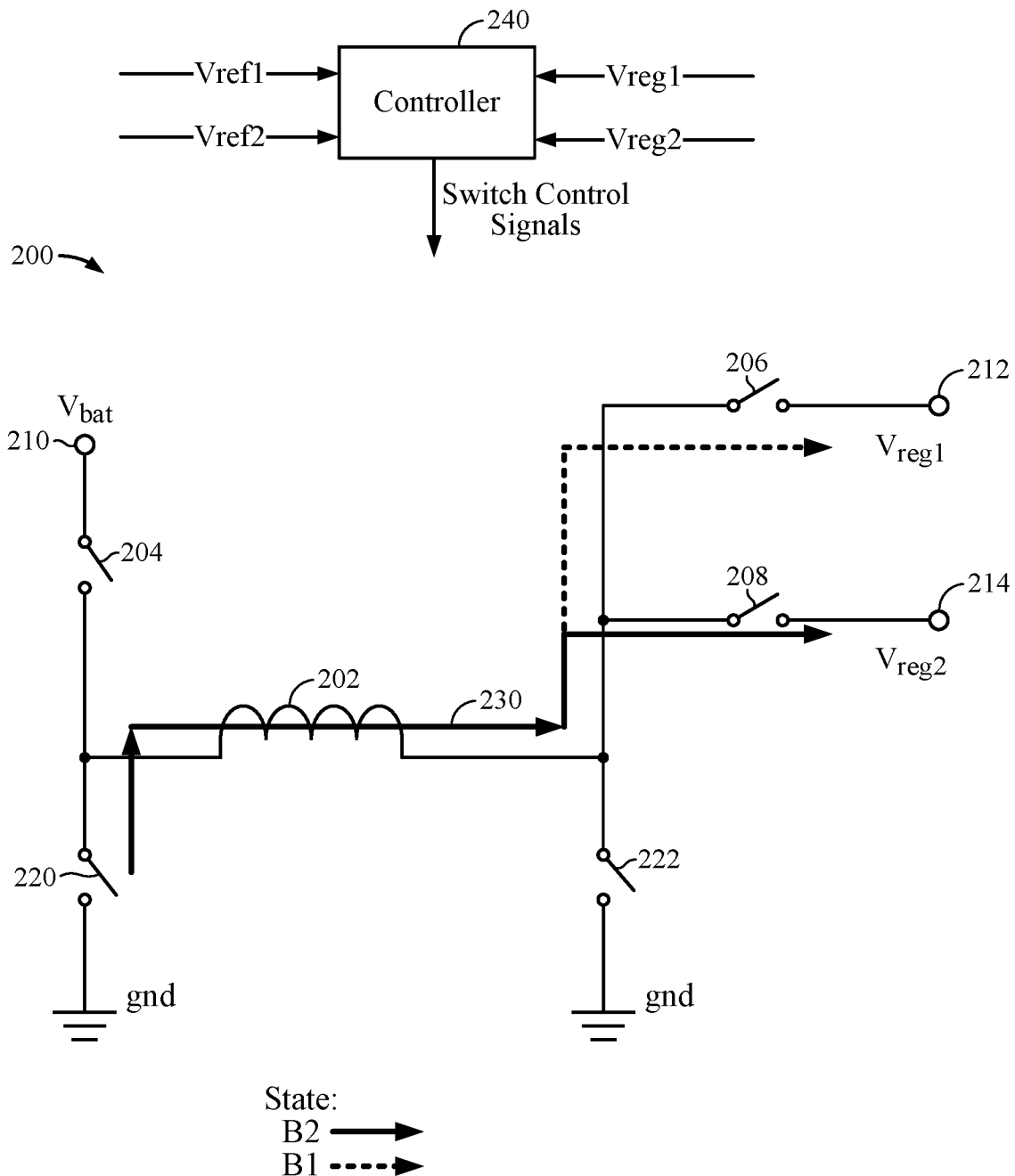
Figure 2C:
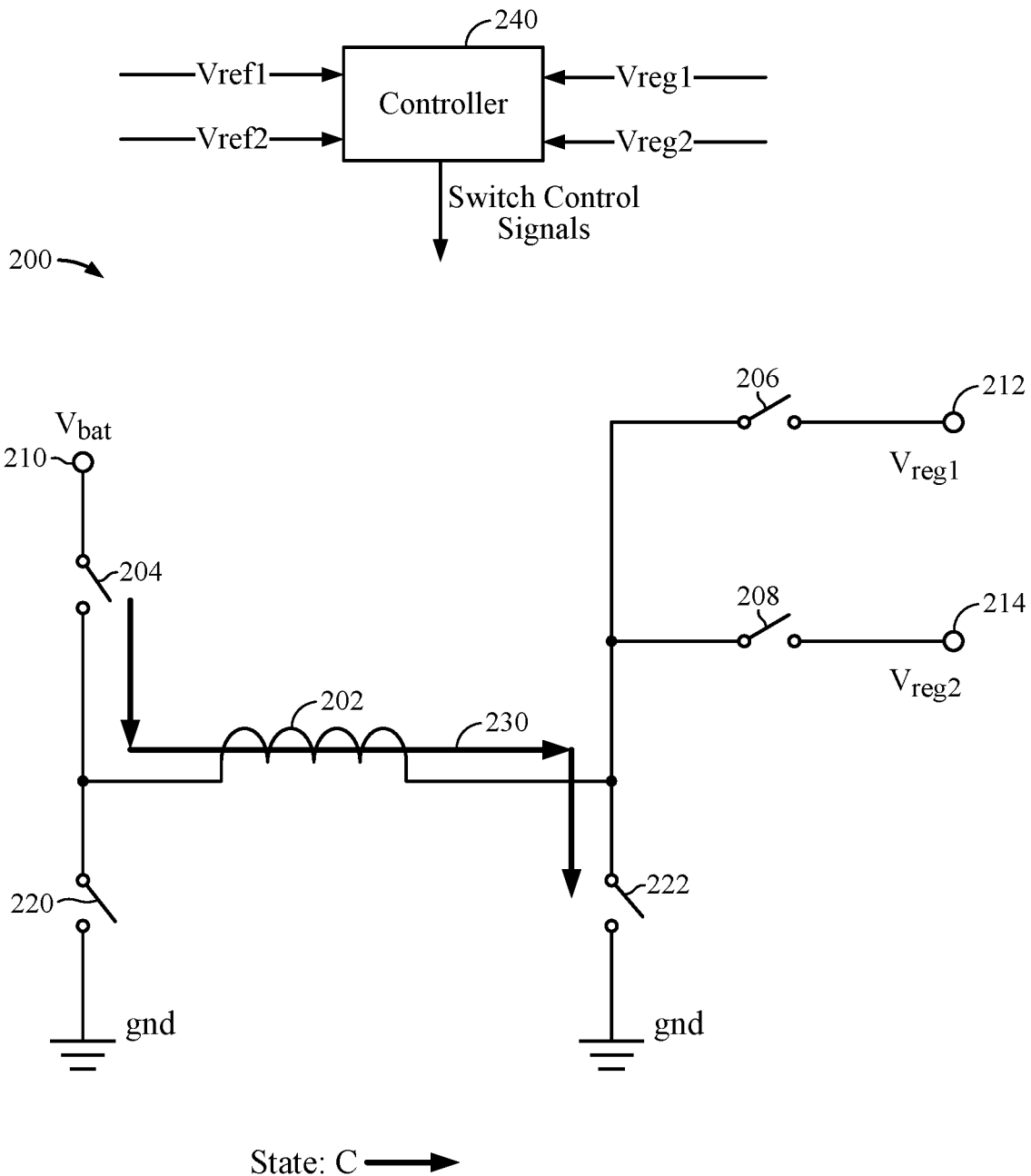

FIGS. 2A-2C are circuit diagrams of an SMPS 200 in three different states. As illustrated, the SMPS 200 includes two outputs (e.g., output nodes 212, 214). A controller 240 may be used to control the switches of the SMPS 200. For example, the controller may receive an indication of a voltage (Vreg1) (also referred to as a feedback voltage) at the output node 212, a voltage (Vreg2) at the output node 214, a reference voltage (Vref1) (also referred to as a target voltage) associated with the output node 212, and a reference voltage (Vref2) associated with the output node 214. The controller 240 may control the switches of the SMPS 200 to provide charge (e.g., direct current) to output nodes 212 in an attempt to set the voltage Vreg1, Vreg2 at the output nodes 212, 214 to be equal to respective reference voltages Vref1, Vref2.

As illustrated in FIG. 2A, in an A1 state and an A2 state (collectively referred to as A states), the inductive element 202 of the SMPS 200 is coupled between the supply node 210 (e.g., providing the supply voltage or battery voltage (Vbat)) and one of the output nodes 212, 214 the SMPS. For example, in the A1 state for regulating Vreg1, the switches 204, 206 are closed via the controller 240 (also referred to as an SMPS controller), coupling the inductive element 202 between the supply node 210 and the output node 212, and in an A2 state for regulating Vreg2, the switches 204, 208 are closed via the controller 240, coupling the inductive element 202 between the supply node 210 and the output node 214. In otherwords, in the state A1, the inductor current 230 is directed to the output node 212 to charge the output node 212 (e.g., charge a storage capacitive element (not shown) coupled to the output node 212). Similarly, in the state A2, the inductor current 230 is directed to the output node 214 to charge the output node 214 (e.g., charge a storage capacitive element (not shown) coupled to the output node 212).

As illustrated in FIG. 2B, during a B1 state and a B2 state (collectively referred to as B states), the inductive element 202 of the SMPS 200 may be coupled between a reference potential node (e.g., electric ground (gnd)) of the SMPS 200 and one of the output nodes 212, 214. For example, in the B1 state for regulating Vreg1, the switches 220, 206 are closed via the controller 240, coupling the inductive element 202 between the reference potential node and the output node 212, and in the B2 state for regulating Vreg2, switches 220, 208 are closed via the controller 240, coupling the inductive element 202 between the reference potential node and the output node 214. In otherwords, in the B1 state, the inductor current 230 is directed to the output node 212, and in B2 state, the inductor current 230 is directed to the output node 214.

As illustrated in FIG. 2C, during a C state, the inductive element 202 of the SMPS 200 is coupled between the supply node 210 and the reference potential node by closing switches 204, 222. During the C state, the inductive element 202 is charged by coupling the inductive element between the supply node 210 and the reference potential node.

Conventionally, an SMPS may be configured to continue charging one of the output nodes 212, 214 (e.g., output node 212) until the output has sufficient charge before switching to charging the other output (e.g., output node 214). For example, the voltage at each of output nodes 212, 214 may be below a respective reference voltage (e.g., target voltage) associated with the output, and the SMPS may be charging output node 212. The SMPS may continue charging the output node 212, until the voltage of the output node 212 reaches the reference voltage associated with the output node 212, before switching to charging output node 214. However, with this approach, the SMPS does not respond to the power demand of the output node 214 until the output node 212 is sufficiently charged. In some cases, the inductor current 230 may be alternatively directed to each output, cycle by cycle. However, if the load currents associated with the output nodes 212, 214 are unbalanced, the more heavily-loaded output may experience a voltage dip whenever the inductor current 230 is being directed to the other output.

Certain aspects of the present disclosure are generally directed to selecting the output to be charged based on a power demand (e.g., undercharge state) or overcharge state associated with the outputs of the SMPS. If one of the outputs of the SMPS is overcharged and another one of the outputs of the SMPS is undercharged, the undercharged output node is selected for charging. Certain aspects of the present disclosure provide techniques for selecting an output of the SMPS to be charged when both the output nodes are overcharged or undercharged, as described in more detail herein. That is, if one of the outputs of the SMPS has a higher power demand, or has a lower amount of overcharge, the output may be given priority when determining which of the outputs is to be charged.

In certain aspects, the power demands or overcharge states associated with the outputs of the SMPS may be determined based on an error voltage associated with the output nodes 212, 214. For example, error voltages (Verr1, Verr2) associated with the respective output nodes 212, 214 may be calculated based on the following equations:

$$Verr1 = Vref1 - Vreg1$$

$$Verr2 = Vref2 - Vreg2$$

In some cases, an error voltage difference parameter (Verr_diff) may be calculated by determining the difference between Verr1 and Verr2. That is, Verr_diff may be calculated based on the following equation:

$$Verr\_diff = Verr2 - Verr1$$

Verr_diff may indicate which of the output nodes is more undercharged, or less overcharged, as described herein. In some cases, Verr_diff may be calculated by applying a weight factor to Verr1 and/or Verr2. For example, Verr_diff may be calculated based on the following equation:

$$Verr\_diff = (k2 \times Verr2) - (k1 \times Verr1)$$

where k1 and k2 are weight parameters that may be applied to adjust the priority that may be given to one of the output nodes. For example, if circuitry coupled to the output node 212 is more sensitive to supply voltage variations, the weight parameter k1 may be set to be greater than the k2 weight parameter.

In certain aspects, the controller 240 may determine whether to charge the output node 212 or the output node 214 based on Verr_diff. The controller 240 may determine which of the output nodes 212, 214 has a higher power demand (e.g., more undercharged), or a lower amount of overcharge based on Verr_diff. For certain aspects, the controller 240 may compare Verr_diff with a hysteresis bound (e.g., ±Vhyst), as described in more detail herein.

Figure 3:
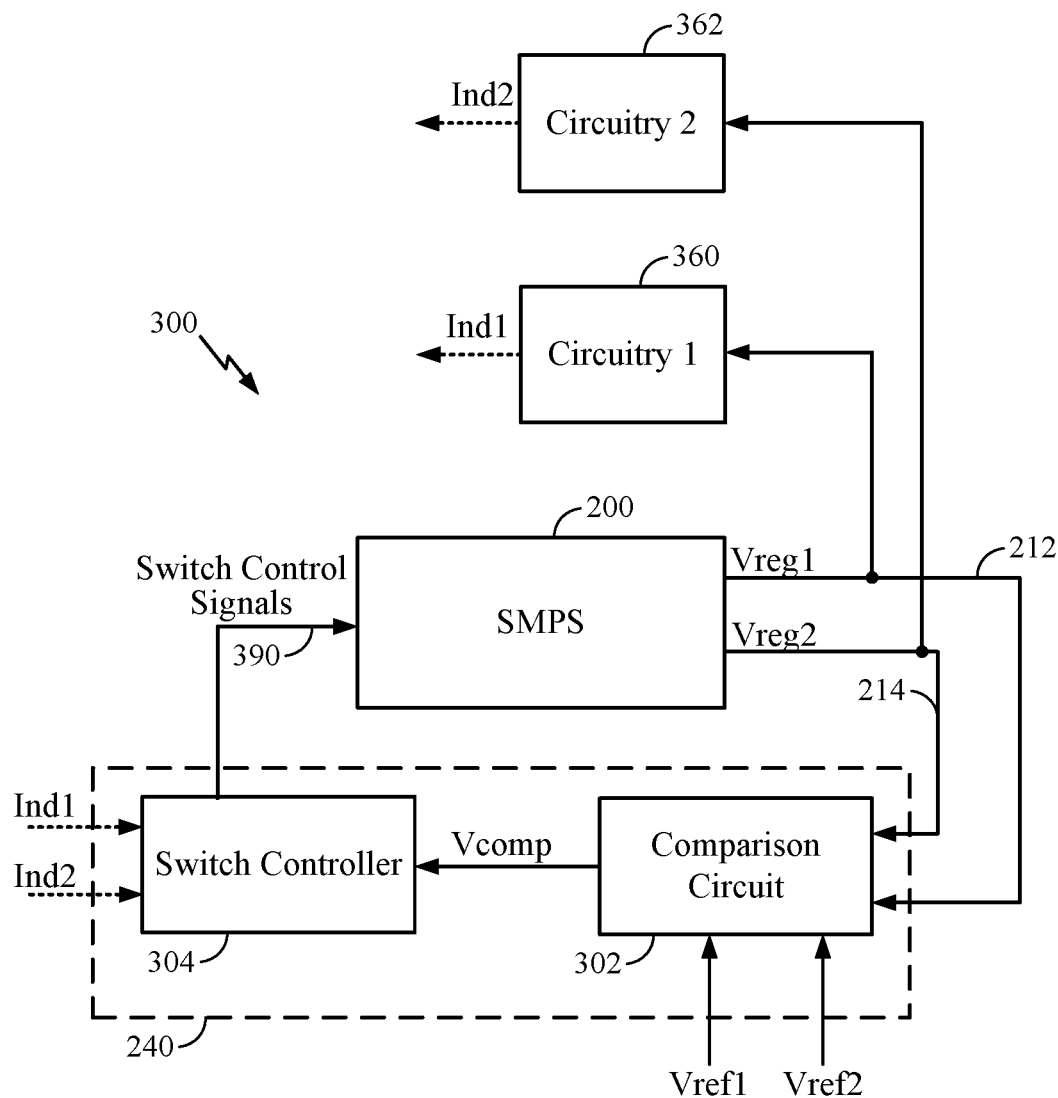
FIG. 3 illustrates a power supply system, in accordance with certain aspects of the present disclosure.

FIG. 3 illustrates a power supply system 300, in accordance with certain aspects of the present disclosure. As illustrated, the controller 240 may include a comparison circuit 302 that obtains Vreg1 and Vreg2 (or a further processed version thereof). The comparison circuit 302 may also receive Vref1 and Vref2 and calculate Verr_diff as described herein. A negative Verr_diff indicates that that the output node 212 is less overcharged or more undercharged than the output node 214. Therefore, in response to a negative Verr_diff, the switch controller 304 may charge (e.g., direct the inductor current 230 to) the output node 212. A positive Verr_diff indicates that that the first output node 214 is less overcharged or more undercharged than the output node 212. Therefore, in response to a positive Verr_diff, the switch controller 304 may charge the output node 214.

In certain aspects, the comparison circuit 302 may generate a comparator output voltage (Vcomp) and provide Vcomp to a switch controller 304. Based on Vcomp, the switch controller 304 may generate switch control signals 390 to control switches of the SMPS 200, as described with respect to FIGS. 2A, 2B, and 2C. In certain aspects, Verr_diff may be compared with a hysteresis bound to generate Vcomp, as described in more detail with respect to FIG. 4.

Figure 4:
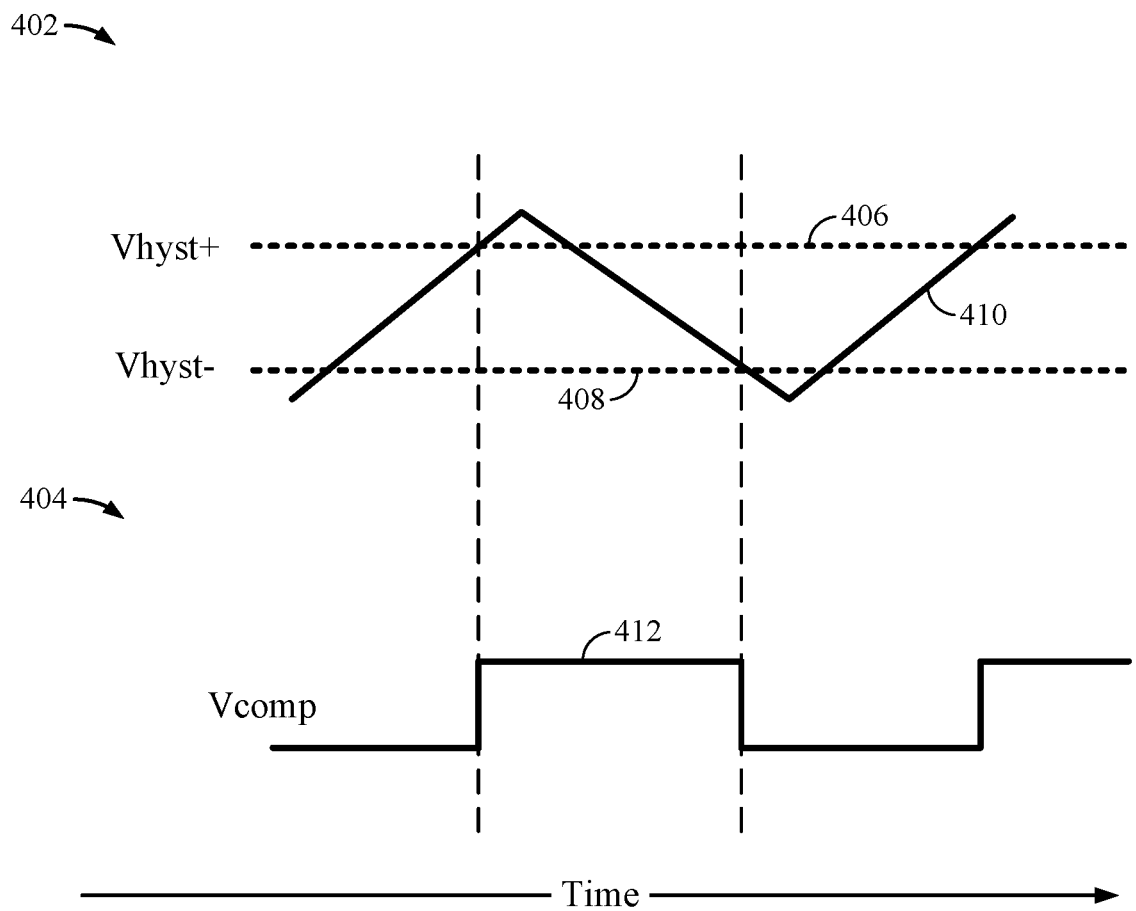
FIG. 4 includes graphs illustrating various signals for controlling an SMPS, in accordance with certain aspects of the present disclosure.

FIG. 4 includes a graph 402 illustrating a positive hysteresis threshold (Vhyst+) 406, a negative hysteresis threshold (Vhyst-) 408, and Verr_diff 410, and a graph 404 illustrating Vcomp 412, in accordance with certain aspects of the present disclosure. As illustrated, when Verr_diff transitions from below Vhyst+ 406 to above Vhyst+ 406, Vcomp 412 transitions from logic low to logic high. In response, the switch controller 304 may charge the output node 214. When Verr_diff transitions from above Vhyst- 408 to below Vhyst- 408, Vcomp 412 transitions from logic high to logic low. In response, the switch controller 304 may charge the output node 212. Otherwise, when Verr_diff is not crossing the hysteresis thresholds 406, 408, Vcomp 412 may maintain its logic state, as shown.

In certain aspects, circuitry 360 may be coupled to the output node 212, and circuitry 362 may be coupled to the output node 214, as illustrated in FIG. 3. The circuitry 360, 362 may each provide an indication (Ind1, Ind2) to a switch controller 304 indicating respective power demands. Based on the indications from the circuitry 360, 362, the switch controller 304 may configure the SMPS 200 as described with respect to FIGS. 2A, 2B, and 2C. For example, if the power demand of circuitry 360 is higher than the power demand of circuitry 362, the output node 212 may be given priority when determining whether to direct the inductor current 230 to the output node 212 or the output node 214.

In certain aspects, the power demand of the output nodes 212, 214 may be determined based on a current draw from each of the output nodes 212, 214. For example, the controller 240 may determine a derivative of each of Vreg1 and Vreg2. For a capacitive load, the derivative of Vreg1 indicates the current draw from output node 212 when the inductor current 230 is not being directed to output node 212, and the derivative of Vreg2 indicates the current draw from output node 214 when the inductor current 230 is not being directed to output node 214. The output node 212 or output node 214 drawing more current (e.g., having a higher derivative voltage) may have a higher power demand, and may be given priority for charging as described herein.

In certain aspects, the power associated with each of the output nodes 212, 214 may be used to determine which of the output nodes is to be charged. For example, the product of the voltage Vreg1, Vreg2 and the respective current draw of each of the output nodes 212, 214 may be calculated via the controller 240 to determine the power associated with the output node, based on which the controller 240 may determine which of the output nodes 212, 214 is to be charged.

Certain aspects described herein allow for a reduction in the ripple voltage at the output of the SMPS 200 when the loads associated with the output nodes are unbalanced. Moreover, certain aspects described herein enable a faster transition from one target voltage to another (or from one load impedance to another) when one of the outputs of the SMPS experiences a target voltage (or load impedance) change by prioritizing the output.

Figure 5:
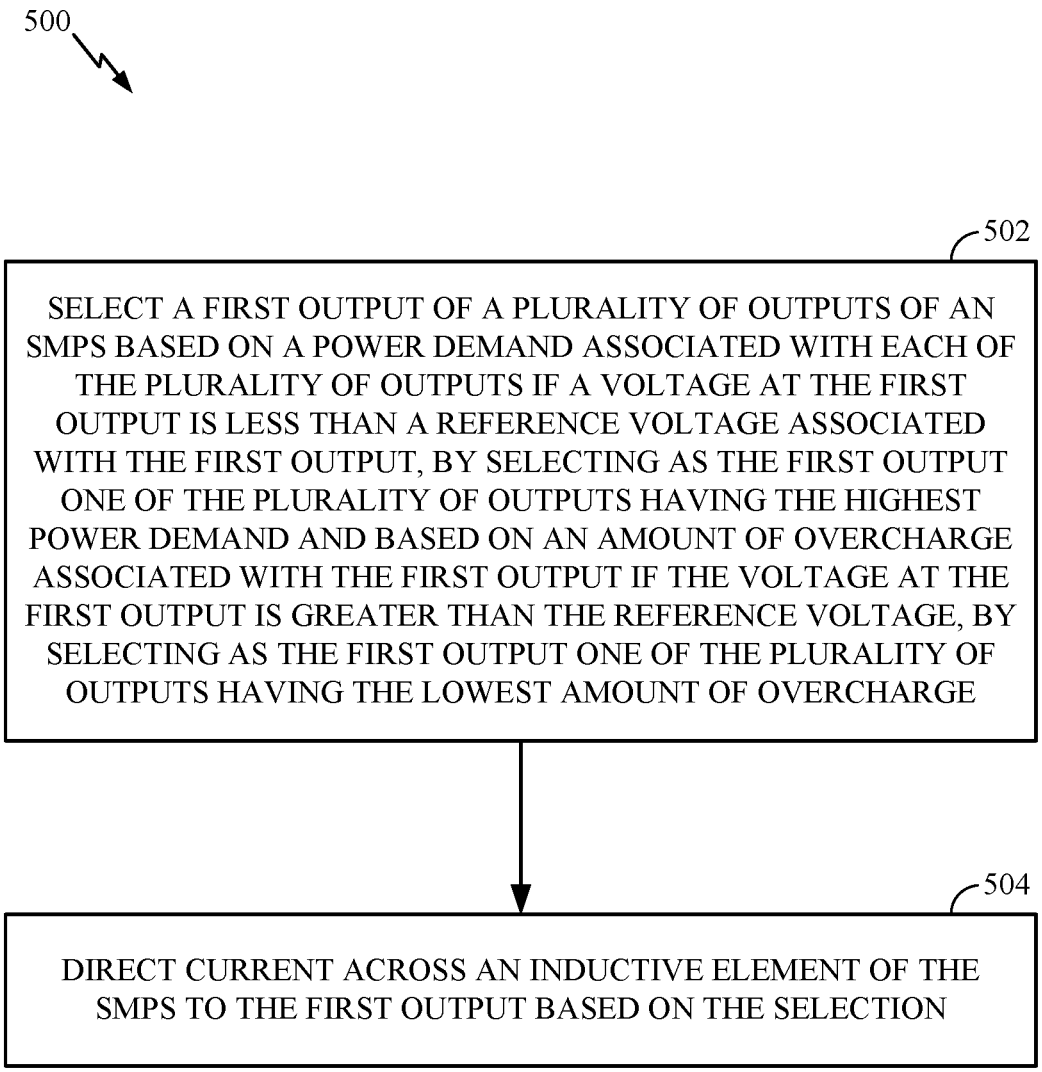
FIG. 5 is a flow diagram illustrating example operations for controlling an SMPS, in accordance with certain aspects of the present disclosure.

FIG. 5 is a flow diagram illustrating example operations 500 for controlling an SMPS (e.g., SMPS 200), in accordance with certain aspects of the present disclosure. The operations 500 may be performed by a power supply system (e.g., power supply system 300) which may include the SMPS 200 and the controller 240.

The operations 500 begin, at block 502, with the power supply system selecting a first output (e.g., output node 212) of a plurality of outputs of the SMPS based on: (a) a power demand (e.g., undercharge) associated with each of the plurality of outputs if a voltage (e.g., Vreg1) at the first output is less than a reference voltage (e.g., Vref1) associated with the first output, by selecting as the first output one of the plurality of outputs having the highest power demand, and (b) an amount of overcharge associated with the first output (e.g., Vreg1) if the voltage at the first output is greater than the reference voltage (e.g., Vref1), by selecting as the first output one of the plurality of outputs having the lowest amount of overcharge. At block 504, the power supply system may direct current (e.g., inductor current 230) across an inductive element (e.g., inductive element 202) of the SMPS to the first output based on the selection.

In certain aspects, the operations 500 also include comparing a first error voltage (Verr1) associated with the first output (e.g., output node 212) with a second error voltage (e.g., Verr2) associated with a second output (e.g., output node 214) of the plurality of outputs, wherein the selection of the first output is based on the comparison. In certain aspects, the operations 500 may also include determining an error voltage difference parameter (e.g., Verr_diff), the error voltage difference parameter representing a difference between the first error voltage and the second error voltage. In this case, the selection of the first output may be based on the error voltage different parameter. In certain aspects, the determination of the error voltage difference parameter may include applying a weight factor to each of at least one of the first error voltage or the second error voltage.

In certain aspects, the current across the inductive element may be directed to the first output (e.g., output node 212) when the error voltage different parameter is less than a first hysteresis threshold (e.g., Vhyst-). The operations 500 may also include directing the current across the inductive element to the second output (e.g., output node 214) when the error voltage different parameter is greater than a second hysteresis threshold (Vhyst+). The second hysteresis threshold may be greater than the first hysteresis threshold.

In certain aspects, the first output is selected if the first error voltage associated with the first output is higher than the second error voltage associated with the second output, the voltage at the first output and a voltage at the second output being less than the reference voltage. In certain aspects, the first output is selected if the first error voltage associated with the first output is greater than the second error voltage associated with the second output, the voltage at the first output and a voltage at the second output being greater than the reference voltage. In certain aspects, the first error voltage includes a difference between the reference voltage (e.g., Vref1) associated with the first output and a voltage at the first output, and the second error voltage includes a difference between a reference voltage (e.g., Vref2) associated with the second output and a voltage at the second output.

In certain aspects, the selecting as the first output one of the plurality of outputs having the highest power demand comprises selecting as the first output one of the plurality of outputs having a highest current draw of the plurality of outputs. In certain aspects, the operations 500 also include determining a derivative of a voltage at the first output, and detecting the current draw of the first output based on the derivative of the voltage. In certain aspects, the power demand of the first output comprises a product of the voltage at the first output and a current draw of first output.

In certain aspects, the first output is configured to provide power to one or more circuits coupled to the first output. In this case, the operations 500 also include receiving an indication corresponding to a power demand of the one or more circuits, wherein the selection is based on the indication, and determining the power demand associated with the first output based on the indication.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering. In certain aspects, means for selecting may be a controller, such as the controller 240. In certain aspects, means for directing may be a controller, such as the controller 240, and/or an SMPS such as the SMPS 200.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, h, or c" is intended to cover: a, b, c, a-b, a-c, b-c, and a-b-c, as well as any combination with multiples of the same element (e.g., a-a, a-a-a, a-a-h, a-a-c, a-b-b, a-c-c, b-b, b-b-b, h-h-c, c-c, and c-c-c or any other ordering of a, b, and c).

The various illustrative logical blocks, modules and circuits described in connection with the present disclosure may be implemented or performed with discrete hardware components designed to perform the functions described herein. The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for controlling a switched-mode power supply (SMPS), comprising:
   selecting a first output of a plurality of outputs of the SMPS based on:
      a power demand associated with each of the plurality of outputs if a voltage at one of the plurality of outputs is less than a reference voltage associated with the one of the plurality of outputs, by selecting as the first output the one of the plurality of outputs having the highest power demand; and
      an amount of overcharge associated with each of the plurality of outputs if the voltage at the one of the plurality of outputs is greater than the reference voltage, by selecting as the first output the one of the plurality of outputs having the lowest amount of overcharge; and
   directing current across an inductive element of the SMPS to the first output based on the selection.

2. The method of claim 1, further comprising comparing a first error voltage associated with the first output with a second error voltage associated with a second output of the plurality of outputs, wherein the selection of the first output is based on the comparison.

3. The method of claim 2, further comprising determining an error voltage difference parameter, the error voltage difference parameter representing a difference between the first error voltage and the second error voltage, wherein the selection of the first output is based on the error voltage difference parameter.

4. The method of claim 3, wherein the determination of the error voltage difference parameter comprises applying a weight factor to the first error voltage or the second error voltage.

5. The method of claim 3, wherein the current across the inductive element is directed to the first output when the error voltage difference parameter is less than a first hysteresis threshold, the method further comprising directing the current across the inductive element to the second output when the error voltage difference parameter is greater than a second hysteresis threshold, the second hysteresis threshold being greater than the first hysteresis threshold.

6. The method of claim 2, wherein the first output is selected if the first error voltage associated with the first output is higher than the second error voltage associated with the second output, the voltage at the first output and a voltage at the second output being less than the reference voltage.

7. The method of claim 2, wherein the first output is selected if the first error voltage associated with the first output is greater than the second error voltage associated with the second output, the voltage at the first output and a voltage at the second output being greater than the reference voltage.

8. The method of claim 2, wherein:
   the first error voltage comprises a difference between the reference voltage associated with the first output and the voltage at the first output; and
   the second error voltage comprises a difference between a reference voltage associated with the second output and a voltage at the second output.

9. The method of claim 1, wherein the selecting as the first output the one of the plurality of outputs having the highest power demand comprises selecting as the first output the one of the plurality of outputs having a highest current draw of the plurality of outputs.

10. The method of claim 9, further comprising:
    determining a derivative of the voltage at the first output when the current across the inductive element is not directed to the first output; and
    determining the current draw of the first output based on the derivative of the voltage.

11. The method of claim 1, wherein the power demand of the first output comprises a product of the voltage at the first output and a current draw of the first output.

12. The method of claim 1, wherein the first output is configured to provide power to one or more circuits coupled to the first output, the method further comprising:
    receiving an indication corresponding to a power demand of the one or more circuits; and
    determining the power demand associated with the first output based on the indication.

13. A power supply system, comprising:
    a switched-mode power supply (SMPS); and
    a controller configured to:
       select a first output of a plurality of outputs of the SMPS based on:
          a power demand associated with each of the plurality of outputs if a voltage at one of the plurality of outputs is less than a reference voltage associated with the one of the plurality of outputs, by selecting as the first output the one of the plurality of outputs having the highest power demand and
          an amount of overcharge associated with the first output if the voltage at the one of the plurality of outputs is greater than the reference voltage, by selecting as the first output the one of the plurality of outputs having the lowest amount of overcharge; and
       configure the SMPS to direct current across an inductive element of the SMPS to the first output based on the selection.

14. The power supply system of claim 13, wherein the controller is further configured to compare a first error voltage associated with the first output with a second error voltage associated with a second output of the plurality of outputs, wherein the selection of the first output is based on the comparison.

15. The power supply system of claim 14, wherein the controller is further configured to determine an error voltage difference parameter, the error voltage difference parameter representing a difference between the first error voltage and the second error voltage, wherein the selection of the first output is based on the error voltage difference parameter.

16. The power supply system of claim 15, wherein the determination of the error voltage difference parameter comprises applying a weight factor to the first error voltage or the second error voltage.

17. The power supply system of claim 15, wherein the current across the inductive element is directed to the first output when the error voltage difference parameter is less than a first hysteresis threshold, the controller being further configured to configure the SMPS to direct the current across the inductive element to the second output when the error voltage difference parameter is greater than a second hysteresis threshold, the second hysteresis threshold being greater than the first hysteresis threshold.

18. The power supply system of claim 14, wherein the first output is selected if the first error voltage associated with the first output is higher than the second error voltage associated with the second output, the voltage at the first output and a voltage at the second output being less than the reference voltage.

19. The power supply system of claim 14, wherein the first output is selected if the first error voltage associated with the first output is greater than the second error voltage associated with the second output, the voltage at the first output and a voltage at the second output being greater than the reference voltage.

20. An apparatus for controlling a switched-mode power supply (SMPS), comprising:
- means for selecting a first output of a plurality of outputs of the SMPS based on:
  - a power demand associated with each of the plurality of outputs if a voltage at one of the plurality of outputs is less than a reference voltage associated with the one of the plurality of outputs, by selecting as the first output the one of the plurality of outputs having the highest power demand; and
  - an amount of overcharge associated with the one of the plurality of outputs if the voltage at the one of the plurality of outputs is greater than the reference voltage, by selecting as the first output the one of the plurality of outputs having the lowest amount of overcharge; and
- means for directing current across an inductive element of the SMPS to the first output based on the selection.

* * * * *